US010856134B2

(12) United States Patent
Palnati et al.

(10) Patent No.: US 10,856,134 B2
(45) Date of Patent: Dec. 1, 2020

(54) SMS MESSAGING USING A SERVICE CAPABILITY EXPOSURE FUNCTION

(71) Applicant: MICROSOFT TECHNOLGY LICENSING, LLC, Redmond, WA (US)

(72) Inventors: Prasasth Palnati, Westford, MA (US); Srinivas Kappla, Nashua, NH (US); Girish Nair, Nashua, NH (US)

(73) Assignee: MICROSOFT TECHNOLGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/135,836

(22) Filed: Sep. 19, 2018

(65) Prior Publication Data

US 2019/0090122 A1    Mar. 21, 2019

Related U.S. Application Data

(60) Provisional application No. 62/560,253, filed on Sep. 19, 2017.

(51) Int. Cl.
*H04W 4/14*      (2009.01)
*H04W 4/70*      (2018.01)
*H04W 8/14*      (2009.01)
*H04W 76/11*     (2018.01)

(52) U.S. Cl.
CPC ............... *H04W 8/14* (2013.01); *H04W 4/14* (2013.01); *H04W 4/70* (2018.02); *H04W 76/11* (2018.02)

(58) Field of Classification Search
None
See application file for complete search history.

(56) References Cited

U.S. PATENT DOCUMENTS

| | | | |
|---|---|---|---|
| 7,346,840 | B1 | 3/2008 | Ravishankar et al. |
| 7,466,694 | B2 | 12/2008 | Xu et al. |
| 7,734,746 | B2 | 6/2010 | Ng et al. |

(Continued)

FOREIGN PATENT DOCUMENTS

| | | |
|---|---|---|
| CN | 101093590 A | 12/2007 |
| CN | 102390184 A | 3/2012 |

(Continued)

OTHER PUBLICATIONS

US 10,505,788 B1, 12/2019, Mills et al. (withdrawn)

(Continued)

*Primary Examiner* — Duc T Duong
(74) *Attorney, Agent, or Firm* — Ray Quinney & Nebeker, P.C.; Thomas M. Hardman; Sunah K. Lee

(57) ABSTRACT

Systems and methods for optimizing SMS communications such that an SMS-SC is bypassed in the communications include receiving, by an A-SCEF, at least one communication from an AS, the at least one communication including a data payload and a generic destination UE identifier, determining, by the A-SCEF, the at least one communication is associated with an SMS communication, creating, by the A-SCEF, a message including the data payload and a network-usable destination UE identifier, and providing, by the A-SCEF, the message to a MME such that it recognizes the message as an SMS communication and forwards the data payload to the UE as an SMS communication.

32 Claims, 10 Drawing Sheets

(56) References Cited

U.S. PATENT DOCUMENTS

| | | | |
|---|---|---|---|
| 8,428,610 B2 | 4/2013 | Chowdhury et al. | |
| 8,477,730 B2 | 7/2013 | Rajagopalan et al. | |
| 8,509,200 B2 | 8/2013 | Li et al. | |
| 8,522,241 B1 | 8/2013 | Vohra et al. | |
| 8,565,070 B2 | 10/2013 | Harper et al. | |
| 8,787,875 B2 | 7/2014 | Ahmed et al. | |
| 8,855,051 B2 | 10/2014 | Suh et al. | |
| 8,995,262 B2 | 3/2015 | Chowdhury et al. | |
| 9,013,993 B2 | 4/2015 | Logan et al. | |
| 9,185,595 B2 | 11/2015 | Qu | |
| 9,294,981 B2 | 3/2016 | Rajagopalan et al. | |
| 9,300,623 B1 | 3/2016 | Earl et al. | |
| 9,578,541 B2 | 2/2017 | Seenappa et al. | |
| 9,985,875 B1 | 5/2018 | Srinath et al. | |
| 10,484,844 B2* | 11/2019 | Sudarsan | H04W 52/0229 |
| 10,536,326 B2 | 1/2020 | Mills et al. | |
| 2002/0007468 A1 | 1/2002 | Kampe et al. | |
| 2002/0023048 A1 | 2/2002 | Buhannic et al. | |
| 2002/0062388 A1 | 5/2002 | Ogier et al. | |
| 2003/0171114 A1 | 9/2003 | Hastings | |
| 2003/0187982 A1 | 10/2003 | Petit | |
| 2004/0131023 A1 | 7/2004 | Auterinen | |
| 2004/0181538 A1 | 9/2004 | Lo et al. | |
| 2004/0193763 A1 | 9/2004 | Iizuka et al. | |
| 2004/0267758 A1 | 12/2004 | Katsurashima | |
| 2005/0120240 A1 | 6/2005 | Kiwimagi et al. | |
| 2005/0136832 A1 | 6/2005 | Spreizer | |
| 2006/0008063 A1 | 1/2006 | Harnesk et al. | |
| 2006/0013191 A1 | 1/2006 | Kavanagh | |
| 2006/0114832 A1 | 6/2006 | Hamilton et al. | |
| 2006/0168655 A1 | 7/2006 | Grandmaitre et al. | |
| 2006/0195607 A1 | 8/2006 | Naseh et al. | |
| 2006/0288404 A1 | 12/2006 | Kirshnan et al. | |
| 2006/0294238 A1 | 12/2006 | Naik et al. | |
| 2007/0101377 A1 | 5/2007 | Six et al. | |
| 2007/0168058 A1 | 7/2007 | Kephart et al. | |
| 2007/0297400 A1 | 12/2007 | Cameron et al. | |
| 2008/0014961 A1 | 1/2008 | Lipps et al. | |
| 2008/0077465 A1 | 3/2008 | Schimpf et al. | |
| 2008/0162984 A1 | 7/2008 | Kalra et al. | |
| 2008/0240082 A1 | 10/2008 | Feldman et al. | |
| 2009/0042537 A1 | 2/2009 | Gelbman et al. | |
| 2009/0109845 A1 | 4/2009 | Andreasen et al. | |
| 2009/0124284 A1 | 5/2009 | Scherzer et al. | |
| 2009/0300173 A1 | 12/2009 | Bakman et al. | |
| 2010/0035587 A1 | 2/2010 | Bennett | |
| 2010/0050172 A1 | 2/2010 | Ferris | |
| 2010/0066804 A1 | 3/2010 | Shoemake et al. | |
| 2010/0128708 A1 | 5/2010 | Liu et al. | |
| 2010/0188975 A1 | 7/2010 | Raleigh | |
| 2010/0238840 A1 | 9/2010 | Lu et al. | |
| 2010/0281151 A1 | 11/2010 | Ramankutty et al. | |
| 2010/0317331 A1 | 12/2010 | Miller | |
| 2011/0131338 A1 | 6/2011 | Hu | |
| 2011/0211583 A1 | 9/2011 | Seetharaman et al. | |
| 2011/0235505 A1 | 9/2011 | Eswara et al. | |
| 2011/0258433 A1 | 10/2011 | Pulini et al. | |
| 2011/0269499 A1 | 11/2011 | Vikberg et al. | |
| 2011/0296232 A1 | 12/2011 | Izawa | |
| 2011/0299386 A1 | 12/2011 | Negoto et al. | |
| 2012/0023360 A1 | 1/2012 | Chang et al. | |
| 2012/0030349 A1 | 2/2012 | Sugai | |
| 2012/0084449 A1 | 4/2012 | Delos Reyes et al. | |
| 2012/0106349 A1 | 5/2012 | Adjakple et al. | |
| 2012/0131647 A1 | 5/2012 | Lan et al. | |
| 2012/0143923 A1 | 6/2012 | Whitney et al. | |
| 2012/0144226 A1 | 6/2012 | Yang et al. | |
| 2012/0177005 A1 | 7/2012 | Liang et al. | |
| 2012/0190331 A1 | 7/2012 | Ahmed et al. | |
| 2012/0207104 A1 | 8/2012 | Liang et al. | |
| 2012/0236708 A1 | 9/2012 | Kompella et al. | |
| 2012/0282937 A1 | 11/2012 | He et al. | |
| 2013/0007286 A1 | 1/2013 | Mehta et al. | |
| 2013/0010756 A1 | 1/2013 | Liang et al. | |
| 2013/0054789 A1 | 2/2013 | Bajamahal | |
| 2013/0094395 A1 | 4/2013 | Lopez et al. | |
| 2013/0100815 A1 | 4/2013 | Kakadia et al. | |
| 2013/0121298 A1 | 5/2013 | Rune et al. | |
| 2013/0173804 A1 | 7/2013 | Murthy et al. | |
| 2013/0188555 A1 | 7/2013 | Olsson et al. | |
| 2013/0212205 A1 | 8/2013 | Flockhart et al. | |
| 2013/0231080 A1 | 9/2013 | Cheuk et al. | |
| 2013/0286821 A1 | 10/2013 | Liu | |
| 2013/0308604 A1 | 11/2013 | Jiang et al. | |
| 2014/0047282 A1 | 2/2014 | Deb et al. | |
| 2014/0098671 A1 | 4/2014 | Raleigh et al. | |
| 2014/0133464 A1 | 5/2014 | Li et al. | |
| 2014/0148165 A1 | 5/2014 | Serravalle et al. | |
| 2014/0160938 A1 | 6/2014 | Qu | |
| 2014/0221025 A1 | 8/2014 | Chandramouli et al. | |
| 2014/0241174 A1 | 8/2014 | Harris et al. | |
| 2014/0359041 A1 | 12/2014 | Bai | |
| 2015/0018131 A1 | 1/2015 | Siefker | |
| 2015/0050924 A1 | 2/2015 | Gotou | |
| 2015/0181431 A1 | 6/2015 | Zheng et al. | |
| 2015/0201364 A1 | 7/2015 | Yamada et al. | |
| 2015/0215768 A1 | 7/2015 | Dong et al. | |
| 2015/0237539 A1 | 8/2015 | Guo | |
| 2015/0271255 A1 | 9/2015 | Mackay et al. | |
| 2015/0280927 A1 | 10/2015 | Liang et al. | |
| 2015/0334615 A1 | 11/2015 | Zhang et al. | |
| 2016/0028607 A1 | 1/2016 | Weill et al. | |
| 2016/0029278 A1 | 1/2016 | Poikonen et al. | |
| 2016/0135143 A1 | 5/2016 | Won et al. | |
| 2016/0270142 A1 | 9/2016 | Olsson et al. | |
| 2016/0285923 A1 | 9/2016 | Kodaypak | |
| 2016/0286385 A1* | 9/2016 | Ryu | H04W 68/02 |
| 2016/0337841 A1 | 11/2016 | Won et al. | |
| 2016/0353325 A1 | 12/2016 | Poikonen | |
| 2017/0127324 A1 | 5/2017 | Liang et al. | |
| 2017/0142762 A1 | 5/2017 | Kedalagudde et al. | |
| 2017/0251342 A1* | 8/2017 | Bhalla | H04W 4/14 |
| 2017/0257810 A1 | 9/2017 | Gandhi | |
| 2018/0049156 A1 | 2/2018 | Laha et al. | |
| 2018/0077714 A1 | 3/2018 | Kodaypak et al. | |
| 2018/0092133 A1* | 3/2018 | Starsinic | H04L 67/1046 |
| 2018/0139797 A1 | 5/2018 | Chun et al. | |
| 2018/0192234 A1 | 7/2018 | Mohamed et al. | |
| 2018/0248711 A1 | 8/2018 | McCann | |
| 2018/0270710 A1 | 9/2018 | Hua et al. | |
| 2018/0279115 A1* | 9/2018 | Tanna | H04W 8/04 |
| 2018/0332636 A1 | 11/2018 | Lu et al. | |
| 2018/0343601 A1* | 11/2018 | Livanos | H04L 45/127 |
| 2018/0368202 A1* | 12/2018 | Landais | H04W 48/12 |
| 2019/0028866 A1* | 1/2019 | Baek | H04W 4/50 |
| 2019/0037441 A1* | 1/2019 | Liu | H04W 60/00 |
| 2019/0313216 A1* | 10/2019 | Wong | H04L 51/38 |
| 2020/0028896 A1 | 1/2020 | Veldanda et al. | |
| 2020/0213973 A1* | 7/2020 | Lee | H04L 1/1642 |

FOREIGN PATENT DOCUMENTS

| | | |
|---|---|---|
| CN | 102555536 A | 7/2012 |
| CN | 202965525 U | 6/2013 |
| CN | 103404181 A | 11/2013 |
| CN | 203311505 U | 11/2013 |
| CN | 104363572 A | 2/2015 |
| CN | 103348335 B | 7/2016 |
| EP | 1011974 A1 | 6/2000 |
| EP | 1518352 B1 | 8/2007 |
| EP | 2200369 A2 | 6/2010 |
| EP | 2709385 A1 | 3/2014 |
| GB | 2409368 A | 6/2005 |
| JP | 2002-319963 A | 10/2002 |
| JP | 2006-501781 A | 1/2006 |
| JP | 2009-522933 A | 6/2009 |
| JP | 2010-88013 | 4/2010 |
| JP | 2010-141555 A | 6/2010 |
| JP | 2011-508474 A | 3/2011 |
| JP | 2011-259440 A | 12/2011 |
| KR | 10-2010-0070691 A | 6/2010 |
| WO | WO-2004004216 A1 | 1/2004 |
| WO | WO-2007081727 A2 | 7/2007 |
| WO | WO-2009107117 A2 | 9/2009 |

(56) References Cited

FOREIGN PATENT DOCUMENTS

| WO | WO-2010066430 A1 | 6/2010 |
|---|---|---|
| WO | WO-2013143831 A1 | 10/2013 |
| WO | WO-2013177693 | 12/2013 |
| WO | WO-2016206118 A1 | 12/2016 |
| WO | WO-2017004158 A1 | 1/2017 |
| WO | WO-2017076088 A1 | 5/2017 |
| WO | WO-2017197589 A1 | 11/2017 |
| WO | WO-2020023511 A1 | 1/2020 |

OTHER PUBLICATIONS

International Search Report and Written Opinion as issued by the U.S. U.S. Patent and Trademark office as International Search authority, received for PCT Patent Application No. PCT/US2011/055183, dated Mar. 8, 2012 (9 pages).
International Search Report and Written Opinion issued by the European Patent Office as International Searching Authority for International Application No. PCT/US19/43037, dated Oct. 29, 2019 (14 pages).
3GPP TR 21.905 v13.1.0 (Jun. 2016), "3rd Generation Partnership Project; Technical Specification Group Services and System Aspects; Vocabulary for 3GPP Specifications (Release 13)", Valbonne, France, Jun. 2016 (65 pages).
3GPP TR 21.905 v15.0.0 (Mar. 2018), "3rd Generation Partnership Project; Technical Specification Group Services and System Aspects; Vocabulary for 3GPP Specifications (Release 15)", Valbonne, France, Mar. 2018 (65 pages).
3GPP TR 23.722 v0.1.1 (Apr. 2017), "3rd Generation Partnership Project; Technical Specification Group Services and System Aspects; Study on Common API Framework for 3GPP Northbound APIs (Release 15)", Valbonne, France, Apr. 2017 (20 pages).
3GPP TS 23.040 v13.2.0 (Sep. 2016), "3rd Generation Partnership Project; Technical Specification Group Core Network and Terminals; Technical Realization of the Short Message Service (SMS) (Release 13)", Valbonne, France, Sep. 2016 (214 pages).
3GPP TS 23.204 v13.1.0 (Jun. 2016), "3rd Generation Partnership Project; Technical Specification Group Services and Systems Aspects; Support of Short Message Service (SMS) Over Generic 3GPP Internet Protocol (IP) Access; Stage 2 (Release 13)", Valbonne, France, Jun. 2016 (59 pages).
3GPP TS 23.682 v. 15.5.0 (Jun. 2018),"3rd Generation Partnership Project; Technical Specification Group Services and System Aspects; Architecture Enhancements to Facilitate Communications with Packet Data Networks and Applications (Release 15)", Valbonne, France, Jun. 2018 (125 pages).
3GPP TS 23.682 v.13.11.0 (Jun. 2018); "3rd Generation Partnership Project; Technical Specification Group Services and System Aspects; Architecture Enhancements to Facilitate Communications with Packet Data Networks and Applications (Release 13)"; Valbonne, France, Jun. 2018 (93 pages).
3GPP TS 23.682 v13.9.0 (Jun. 2017), "3rd Generation Partnership Project; Technical Specification Group Services and System Aspect; Architecture Enhancements to Facilitate Communications with Packet Data Networks and Applications (Release 13)", Valbonne, France, Jun. 2017 (93 pages).
3GPP TS 23.682 v14.3.0, "3rd Generation Partnership Project; Technical Specification Group Services and System Aspects; Architecture enhancements to facilitate communications with packet data networks and applications (Release 14)", Valbonne, France, Mar. 2017 (106 pages).
3GPP TS 29.128 v13.3.0 (Dec. 2016), "3rd Generation Partnership Project; Technical Specification Group Core Network and Terminals; Mobility Management Entity (MME) and Serving GPRS Support Node (SGSN) Interfaces for Interworking with Packet Data Networks and Applications (Release 13)", Valbonne, France, Dec. 2016 (47 pages).
3GPP TS 29.338 v13.3.0 (Dec. 2016), "3rd Generation Partnership Project; Technical Specification Group Core Network and Terminals; Diameter Based Protocols to Support Short Message Service (SMS) Capable Mobile Management Entities (MMEs) (Release 13)", Valbonne, France, Dec. 2016 (50 pages).
Cisco Systems, "Deployment Guide: Cisco IOS IPSEC High Availability", 2005, accessed http://www.cisco.com/en/US/technologies/tk583/tk372/technologies_white_paper0900aecd80278edf.pdf, retrieved Jul. 26, 2018 (16 pages).
International Search Report and Written Opinion issued by the European Patent Office as International Searching Authority in International Application No. PCT/US2018/035345, dated Aug. 13, 2018 (19 pages).
International Search Report and Written Opinion issued by the European Patent Office as International Searching Authority in International Application No. PCT/US2018/031423, dated Oct. 9, 2018 (18 pages).
International Search Report and Written Opinion issued by the U.S. Patent and Trademark Office as Searching Authority, issued in International Application PCT/US16/69092, dated Mar. 29, 2017 (15 pages).
3GPP TR 23.714 V.14.0.0, "3rd Generation Partnership Project; Technical Specification Group Services and System Aspects; Study on Control and User Plane Separation of EPC Nodes (Release 14)"; Valbonne, France, Jun. 2016 (87 pages).
3GPP TS 23.214 V14.5.0, "3rd Generation Partnership Project; Technical Specification Group Services and System Aspects; Architecture enhancements for control and user plane separation of EPC nodes; Stage 2 (Release 14)", Valbonne, France, Dec. 2017 (84 pages).
3GPP TS 23.236 v12.0.0 (Jun. 2013); "3rd Generation Partnership Project; Technical Specification Group Services and System Aspects; Intra-domain connection of Radio Access Network (RAN) nodes to multiple Core Network (CN) nodes (Release 12)", 3GPP Organizational Partners, Valbonne, France, Jun. 2013 (40 pages).
3GPP TS 23.236 v13.0.0 (Jun. 2015); "3rd Generation Partnership Project; Technical Specification Group Services and System Aspects; Intra-domain connection of Radio Access Network (RAN) nodes to multiple Core Network (CN) nodes (Release 13)", 3GPP Organizational Partners, Valbonne, France, Jun. 2015 (41 pages).
3GPP TS 23.401 V13.9.0 (Dec. 2016), "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne, France, Dec. 2016 (374 pages).
3GPP TS 23.401v13.5.0 (Dec. 2015), "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne France, Dec. 2015 (337 pages).
3GPP, "Universal Mobile Telecommunications System (UMTS); UTRAN Overall Description (3GPP TS 25.401 version 12.0.0 Release 12)", ETSI TS 125 401 v12.0.0 (Oct. 2014); European Telecommunications Standards Institute, Oct. 2014, pp. 1-64 (65 pages—entire document).
Apple, 3GPP Draft, "A solution of network slice instance selection and association", Temporary Document, SA WG2 Meeting #S2-116BIS, S2-165127, Aug. 29-Sep. 2, 2016, Sanya, P.R China, Sep. 2016 (5 pages).
European Extended Search Report issued in EP16882635.2. dated Jul. 17, 2019 (13 pages).
Extended European Search Report issued in European Patent Application No. 12825827.4, dated Mar. 6, 2015 (7 pages).
Extended European Search Report issued in European Patent Application No. 16762501.1, dated Oct. 30, 2018 (11 pages).
Giust, F. et al., "ETSI: MEC Deployments in 4G and Evolution Towards 5G", ETSI White Paper No. 24, First Edition, ISBN No. 979-10-92620-18-4, Feb. 2018 (24 pages).
Horak, R., Excerpt from "Internet Protocols", in Telecommunications and Data Communications Handbook, John Wiley & Sons, pp. 663-664, Aug. 2007 (2 pages).

(56) References Cited

OTHER PUBLICATIONS

International Search Report and Written Opinion issued by the European Patent Office as International Searching Authority in International Application No. PCT/US2019/018666, dated Jul. 10, 2019 (26 pages).

International Search Report and Written Opinion issued by the European Patent Office as International Searching Authority, issued in International Application No. PCT/US19/23138, dated May 29, 2019 (16 pages).

International Search Report and Written Opinion issued by the U.S. Patent and Trademark Office as International Searching Authority for International Application No. PCT/US12/21520 dated May 8, 2012 (8 pages).

International Search Report and Written Opinion issued by the U.S. Patent and Trademark Office as International Searching Authority for International Patent Application No. PCT/US16/21744 dated Jun. 9, 2016 (8 pages).

International Search Report and Written Opinion issued by the U.S. Patent and Trademark Office as International Searching Authority, received for PCT Patent Application No. PCT/US12/25577, dated May 21, 2012, 7 pages.

International Search Report and Written Report issued by the U.S. Patent and Trademark Office as International Searching Authority, issued in PCT/US17/017913, dated Mar. 13, 2017 (14 pages).

Rodriguez, et al., "A 3GPP System Architecture Evolution Virtualized Experimentation Infrastructure for Mobility Prototyping (Invited Paper)", Proceedings of the 4th International Conference on Testbeds and Research Infrastructure for the Development of Networks & Communities (Tridentcom), Mar. 18, 2008 (10 Pages).

Taniguchi, et al., "Implementation and Evaluation of Cooperative Proxy Caching System for Video Streaming Services", Technical Report of the Institute of Electronics Information and Communication Engineers, IEICE, Japan, vol. 103(650):13-18, Feb. 5, 2004—English Abstract.

Hakala, H. et al., "Diameter Credit-Control Application, RFC 4006", Network Working Group, Standards Track, http://tools.ietf.org/html/rfc4006, pp. 1-11, 55-57, 69, 71-75, Aug. 2005 (20 pages).

* cited by examiner

SMS MESSAGING USING A SERVICE CAPABILITY EXPOSURE FUNCTION

CROSS-REFERENCE TO RELATED APPLICATIONS

This application claims priority under 35 U.S.C. 119(e) to U.S. Provisional Application No. 62/560,253, filed Sep. 19, 2017, entitled, "SMS Messaging Using a Service Capability Exposure Function for Internet-Of-Things Devices," the contents of which are incorporated herein in their entirety.

BACKGROUND

Field of Invention

The present disclosure generally relates to communications networks and to packet data network ("PDN") architectures. In particular, the invention relates to maximizing functionality of the Service Capability Exposure Function ("SCEF") node in PDN architectures for efficient structures in scalable Internet of Things ("IoT") core networks.

Description of Related Art

The $3^{rd}$ Generation Partnership Project ("3GPP") has defined a Service Capability Exposure Function ("SCEF") in standards document 23.682, "Architecture Enhancements to Facilitate Communications with Packet Data Networks ("PDNs") and Applications." SCEF defines both paths for data to travel and control plane actions and makes it possible for external Application Servers to communicate with the various network functions without needing to know all of the communications protocols.

NB IoT devices typically have to monitor paging from applications in order to ensure that they receive communications. If the actual page messages are infrequent, this reduces the battery life of NB IoT devices. Furthermore, existing network infrastructure includes many specialized network elements that are required for communicating with NB IoT devices through messages such as SMS. Accordingly, a simplified process in which NB IoT devices can receive messages is needed.

SUMMARY

According to embodiments set forth herein, a set of node-connecting interfaces are defined within an Augmented SCEF ("A-SCEF") that work together to provide substantial flexibility to the Service Provider in delivering Short Message Service ("SMS") messages over the network directly from an A-SCEF to an Mobility Management Entity/Cellular IoT Serving Gateway Node ("MME/CSGN") without use of Short Message Service-Service Centre ("SMS-SC") gateways.

Systems and methods are disclosed for optimizing Short Message Service (SMS) communications such that an SMS Service Center (SMS-SC) is bypassed in the communications. In some embodiments, an augmented Service Capability Exposure Function ("A-SCEF") receives at least one communication from an Application Server ("AS"), the at least one communication including a data payload and a generic destination user equipment (UE) identifier, determines the at least one communication is associated with an SMS communication, creates a message including the data payload, a network-usable destination UE identifier, and an SMS indicator based on the determination that the at least one communication is associated with an SMS communication, and provides the message to a Mobility Management Entity ("MME") such that the MME recognizes the message as an SMS communication and forwards the data payload to the UE as an SMS communication.

In some embodiments, the receiving, by the A-SCEF, at least one communication from the AS comprise receiving via an Application Programming Interface ("API"). In some embodiments, the receiving, by the A-SCEF, at least one communication from the AS comprise receiving via a Short Message Peer to Peer/Computer Interface to Message Distribution protocol ("SMPP/CIMD"). In some embodiments, the providing, by the A-SCEF, at least the data payload to the MME comprises providing the data payload over a T6a interface from the A-SCEF to the MME. In some embodiments, the MME receives the message from the A-SCEF, determines that the data payload is associated with an SMS communication based on the SMS indicator; and transmits the data payload as an SMS communication to the UE. In some embodiments, the transmitting by the MME further comprises sending, via the MME, the data payload to the UE at a predetermined wakeup time of the UE. In some embodiments, the A-SCEF queries a home subscriber server ("HSS") to obtain the network-usable destination UE identifier. In some embodiments, the UE is an Internet of Things ("IoT") device and the MME includes Cellular Internet of Things (CIoT) Serving Gateway Node (CSGN).

In some embodiments, an A-SCEF receives at least one communication from an Application Server ("AS"), the at least one communication including a data payload and a generic destination user equipment (UE) identifier; determines the at least one communication is associated with an SMS communication; creates a message including the data payload and a network-usable destination UE identifier; and provides the message to the MME using an SGd interface between the A-SCEF and the MME such that the MME recognizes the message as an SMS communication and forwards the data payload to the UE as an SMS communication.

In some embodiments, the receiving, by the A-SCEF, at least one communication from the AS comprise receiving via an Application Programming Interface ("API"). In some embodiments, the receiving, by the A-SCEF, at least one communication from the AS comprise receiving via a Short Message Peer to Peer/Computer Interface to Message Distribution protocol ("SMPP/CIMD"). In some embodiments, the MME receives the message from the A-SCEF; determines that the payload is to be delivered as an SMS communication based on the communication interface with the A-SCEF; and transmits the SMS communication to the UE. In some embodiments, the recognizing by the MME that the payload is to be delivered as an SMS communication comprises recognizing that the message was received using an SGd interface. In some embodiments, the transmitting by the MME further comprises transmitting, via the MME, the data payload to the UE at a predetermined wakeup time of the UE. In some embodiments, the A-SCEF queries a home subscriber server ("HSS") to obtain the network-usable destination UE identifier. In some embodiments, the UE is an Internet of Things ("IoT") device and the MME includes Cellular Internet of Things (CIoT) Serving Gateway Node (CSGN).

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

The 3GPP has defined an SCEF in standards documents 23.682, "Architecture Enhancements to Facilitate Communications with Packet Data Networks ("PDNs") and Applications" and 21.905, "3GPP; Technical Specification Group Services and System Aspects; Vocabulary for 3GPP Specifications," the contents of which are herein incorporated by reference in their entireties. More specifically, beginning with Release 13, standards document 23.682 contemplated the architecture for Narrowband Internet-of-Things ("NB-IoT"), which connects devices simply and efficiently over Low Power Wide Area ("LPWA") networks allowing 2-way communication with less-frequent, very low power signals. The SCEF standards define paths for user data to travel and for control plane actions and makes it possible for external Application Servers ("AS") to communicate with the various network functions without needing to know the communications protocols implemented in the network. However, the 23.682 specification (which defines SCEF and MTC-IWF functions) is a collection of functionalities and not a product. Although the SCEF functionality is generically defined in the 3GPP standards, interfaces to Application Servers and Service Capability Servers are considered outside the scope of standardization. As used herein, an AS is generically defined in "The Cloud" (e.g., can be located in "The Cloud"), and machine-to-machine ("M2M") communication can include an AS attempting to communicate with an application running on a user device (also referred to herein as user equipment ("UE"), e.g., a thermostat).

Embodiments of the present disclosure describe methods and systems for SCEF-based IoT communications that allow a network Service Provider (also referred to herein as an "operator") to deploy functionalities for an end-to-end IoT service. As used herein, "SCEF" refers to the functions defined in the 23.682 document—in particular, the SCEF and MTC-IWF functionality is included in "SCEF". Embodiments set forth herein address multiple challenges to IoT implementation. Embodiments included herein apply to communication that is multi-directional along the respective protocol channels. The communication methods between nodes of the SCEF architecture could be applied to any variants of interrogation within the system.

Figure 2:
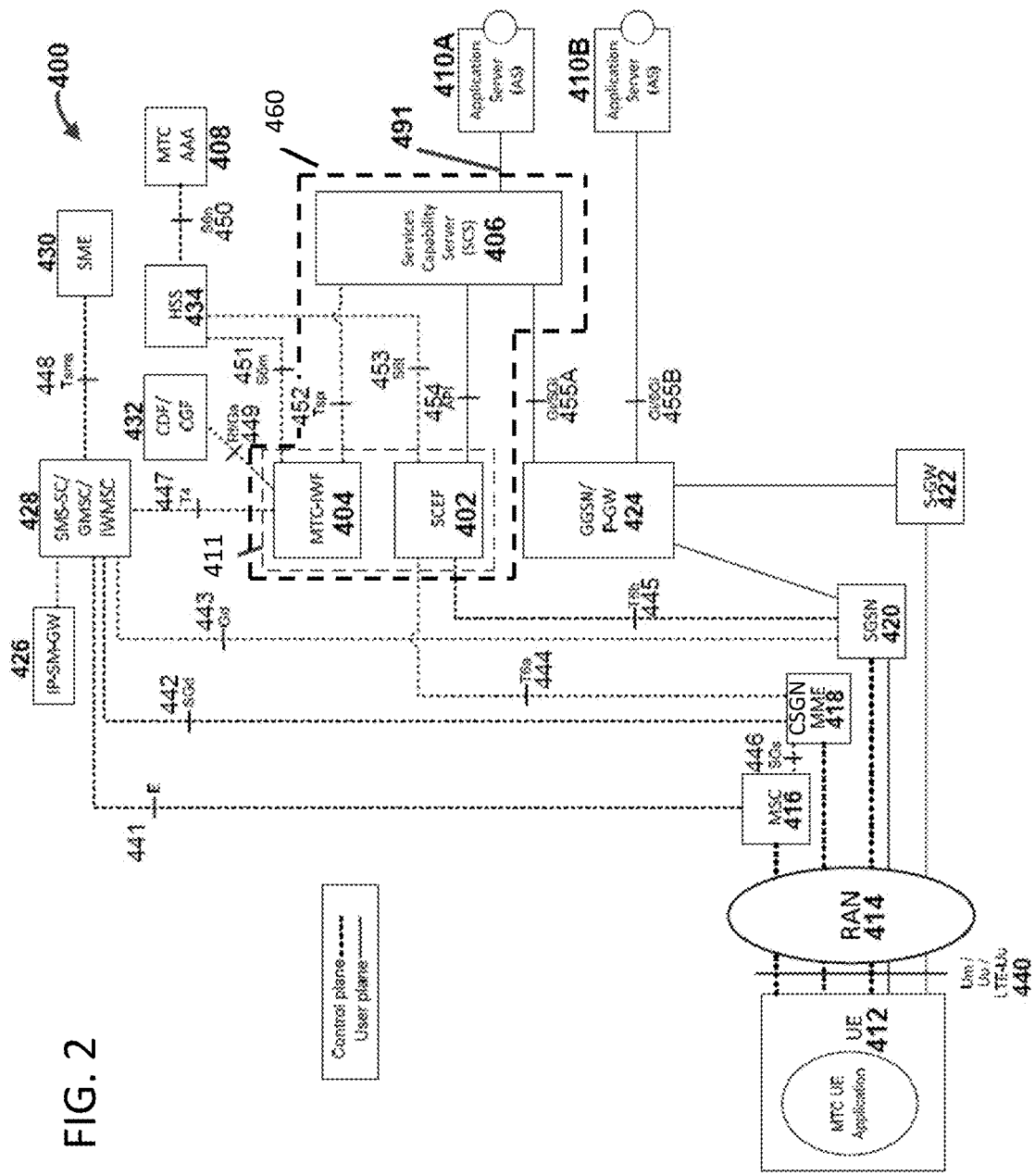
FIG. 2 is a block diagram of an A-SCEF implementation, in accordance with some embodiments of the present disclosure.

The disclosed communication channels, exemplified in FIG. 2 refers to the protocols between nodes of an SCEF-based IoT corresponding to the messages shown in the call flows in the 23.682 standard (but defined and expanded on according to methods described herein).

Embodiments of the present disclosure also describe systems and methods for providing an augmented Service Capability Exposure Function ("A-SCEF") for optimizing Short Message Service (SMS) communications such that an SMS Service Center (SMS-SC) is bypassed in the communications.

Augmented SCEF Implementation

Embodiments described herein focus on the SCEF functionality required to support communication for NB-IoT devices.

High Level Architecture

Figure 1:
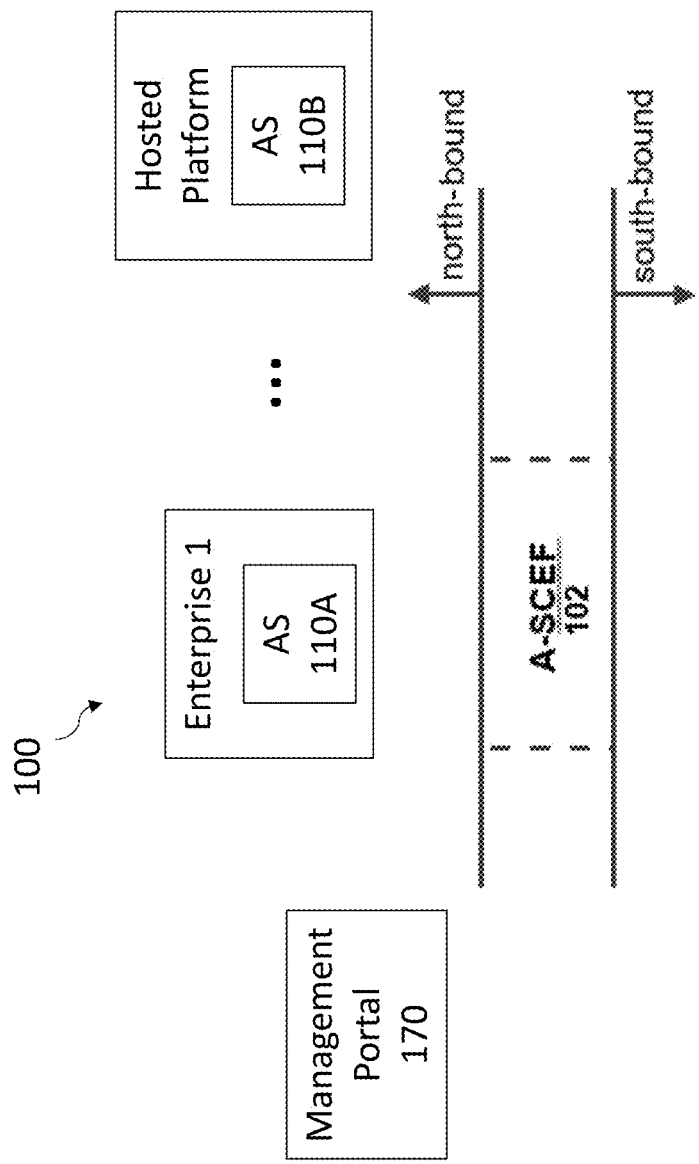
FIG. 1 is a block diagram showing north-bound and south-bound interfaces relative to an SCEF, in accordance with some embodiments of the present disclosure.

FIG. 1 shows north-bound and south-bound interfaces relative to an A-SCEF 102 within an IoT communications system 100, according to some embodiments of the present disclosure. As shown in FIG. 1, embodiments of the IoT communications system 100 include a Management Portal 170, AS 110A (associated with Enterprise 1) and AS 110B (e.g., one associated with a Hosted Platform), all disposed north of the A-SCEF 102. An Enterprise may be an entity that owns and interacts with one or more IoT devices. According to some embodiments, the IoT devices are NB-IoT ("Narrow Band") devices that often send less data than traditional IoT devices. These can include, for example, power meters. According to some embodiments, the IoT devices are not NB-IoT devices, and implement at least some of their communications with smaller amounts of data. By way of a non-limiting example, these IoT devices may include a security camera that streams video footage and receives on/off commands via NB-type communications, or the like. Each Enterprise can have one or more Application Servers to communicate with one or more IOT devices. The SCEF (as per 3GPP Specification 23.682) provides a "means to securely expose the services and capabilities provided by 3GPP network interfaces." According to some embodiments, the A-SCEF includes all the SCEF functionality and incorporates additional functionality, such as, for example, some functions of the Service Capability Server ("SCS") and other network elements such as the MTT/IWF and SCEF as shown in FIG. 1. As used herein, the term "north-bound," when used in reference to communications involving the A-SCEF, refers to the A-SCEF's interfaces with the Application Servers (AS), and the term "south-bound," when used in reference to communications involving the A-SCEF, refers to the A-SCEF's interfaces with 3GPP network elements. The A-SCEF functionality interfaces on the north-bound side with one or more Application Servers, and, with one or more 3GPP network elements on the south-bound side. The north-bound interfaces are outside the 3GPP scope, while the south-bound interfaces are within the 3GPP scope (as are UEs).

In some implementations, the AS and the UE/device (e.g., the NB-IoT device) enforce end-to-end security protocols and achieve privacy, encryption, and authorized access. As a result, the "message" from the AS to/from the device is not necessarily readable by the A-SCEF—it can simply be an "opaque" sequence of bytes. In implementations where the A-SCEF implementation does not implement any retries of messages (i.e., where the A-SCEF doesn't attempt a number of retries such that the AS can't assume that messages are going to be sent and needs to handle undeliverable messages), the application layer (AS to NB-IoT device) can implement robust transport protocols that allow for the AS to handle undelivered messages. According to some embodiments, the A-SCEF may handle these situations without the need to communicate with the AS.

In the discussion that follows, the A-SCEF is discussed as a standalone function in a direct deployment model, however the present disclosure is not limited to such an implementation. As used herein, the term "A-SCEF" refers to the functions of SCEF in the 23.682 document supplemented by the disclosed capabilities described herein.

FIG. 2 is a block diagram showing networked system including an A-SCEF, according to some embodiments of the present disclosure. Some embodiments of the present disclosure are mapped onto elements shown in the block diagram of FIG. 2, for reference. It should be appreciated that while these elements typically function as discussed in the associated standards, certain functions have been altered as described in the present disclosure. FIG. 2 shows a networked system including a Services Capability Server (SCS) 406, an SCEF 402, an Machine-Type Communications Interworking Function (MTC-IWF) 404, AS 410A, AS 410B, Gateway General Packet Radio Services (GPRS) Support Node/Public Data Network (PDN) Gateway GGSN/P-GW 424, Serving Gateway (S-GW) 422, Serving GPRS Support Node (SGSN)/MME 418, Cellular Internet of Things (CIoT) Serving Gateway Node (CSGN) 420, Mobile Switching Center (MSC) 416, Radio Access Network (RAN) 414, UE 412, MTC Accounting and Authorization (MTC AAA) 408, Home Subscriber Server (HSS) 434, Charging Data Function (CDF)/Charging Gateway Function (CGF) 432, Short Message Service (SMS)-Service Center (SC)/Gateway Mobile-services Switching Center (GMSC)/Inter Working Mobile Switching Center (IWMSC) 428, IP Short-Messaging Gateway (IP-SM-GW) 426, and Short Message Entity (SME) 430. The line 460 indicates an A-SCEF having functionality encompassing parts or all of the SCS 406, SCEF 402, and MTC-IWF 404. According to some embodiments, the function of these elements can be summarized as follows:

SCS 406: The Service Capability Server (SCS) is an entity which connects MTC application servers to the 3GPP network to enable them to communicate, for example, through specific 3GPP defined services with UEs used for MTC and with the MTC-IWF. The SCS offers capabilities for use by one or multiple MTC application servers.

SCEF 402: The Service Capability Exposure Function (SCEF) can be an entity within the 3GPP architecture for service capability exposure that can provide a for securely exposing the services and capabilities provided by 3GPP network interfaces.

PLMN: A public land mobile network (PLMN), can be a network that is established and operated by an administration for the purpose of providing land mobile telecommunications services to the public.

MTC: Machine-type communication (MTC) is a form of data communication which involves one or more entities that do not necessarily need human interaction.

MTC-IWF 404: MTC Interworking Function (IWF) can be a functional entity which hides the internal PLMN topology and relays information to invoke specific functionality in the PLMN.

AS 410A/AS 410B: An application server can be a software framework that can provide both for creation of web applications and a server environment to run them.

GGSN/P-GW 424: Gateway GPRS Support Node (GGSN)/Packet Data Network Gateway (PDNGW/PGW) is the main gateway node in 3G/4G networks.

S-GW 422: The Serving Gateway (SGW) can route and forward user data packets, while also acting as the mobility anchor in 4G networks.

MS/UE: Mobile System (MS) or User Equipment (UE) can be served by mobile networks.

SGSN 420: The Serving GPRS Support Node (SGSN) is the node that can serve the MS/UE. It can route and forward user data packets while also acting as the mobility anchor in 3G networks.

C-IoT: Cellular Internet of Things can encompass the cellular framework to support MTC.

CSGN/MME 418: The C-IoT Serving Gateway Node (C-SGN) can combine the MME and some of PGW and SGW functions to provide a highly optimized CIoT solution. The Mobility Management Entity (MME) can handle the signaling related to mobility and security in 4G networks.

MSC 416: The Mobile Switching Centre (MSC) is a telephone exchange that can make the connection between mobile users within the network, from mobile users to the public switched telephone network and from mobile users to other mobile networks.

RAN 414: The Radio Access Network can provide access to MS/UE referring specifically to the infrastructure encompassing the radio nodes.

UE 412: User Equipment (UE) can be served by mobile networks

MTC AAA 408: Machine-type communication (MTC) is a form of data communication that can involve one or more entities that do not necessarily need human interaction. AAA can refer to Authentication, Authorization and Accounting which is a node that can be used to mediate network access.

HSS 434: The Home Subscriber Server (HSS) is a database that can contain user-related and subscriber-related information which provides support functions in mobility management, call and session setup, user authentication and access authorization.

CDF/CGF 432: Charging Data Function (CDF)/Charging Gateway Function (CGF) refers to nodes that can process and store the Charging Data Records (CDRs) which contain usage data of UEs SMS-SC/GMSC/IWMSC 428: The Short Message Service Center (SMSC)/Gateway Mobile-services Switching Centre (GMSC)/Interworking Mobile-services Switching Centre (IWMSC) can be a set of network elements in the mobile telephone network which can store, forward, convert and deliver Short Message Service (SMS) messages.

IP: The Internet Protocol can be the main protocol used in the Internet for forwarding packets.

IP-SM-GW 426: IP-Short-Message-Gateway (IP-SM-GW) can be a node that can enable SMS services for IP enabled devices.

SME 430: Short Message Entity (SME) is a device connected to the SMSC that can send or receive SMSs.

As shown in FIG. 2, the AS 410A interacts with the SCS 406 over channel 491 to invoke APIs (for various reasons including sending of data/SMS etc) and get notifications. The SCS 406 interacts via an Application Programing Interface (API) 454 to invoke APIs (for various reasons including sending of data/SMS etc) and get notifications. The SCS 406 also interacts with the MTC-IWF 404 via the Tsp interface 452 to send SMS and get notifications. MTC AAA 408 interacts with the HSS 434 via an S6n interface 450 to authenticate and authorize the request and the device. HSS 434 interacts with the SCEF 402 and MTC-IWF via the S6m 543 and S6t 541 interfaces, respectively, to authenticate and authorize the request and the device and to map information as required. MTC-IWF interacts with the CDF/CGF 432 via the Rf/Ga interface 449 to provide charging information. Interaction between the MTC-IWF 404, the SMS-SC/GMSC/IWMSC 428, SME 430, IP-SM-GW 426, and CSGN MME 418 via Tsms 448, T4 447, and SGd 442 are described in more detail with respect to similarly labeled elements in FIG. 4. SMS-SC/GMSC/IWMSC 428 can also interact with the MSC 416 over the E interface 441 and with the SGSN 420 over the Gd interface 443 to support SMS storage, delivery and conversion. The SCEF 402 connects to CSGN MME 418 via the T6a 444 interface as described in more detail below, and also to the SGSN 420 via T6b 445. GGSN/P-GW 424 interacts with SGSN 420 and 422 to send and receive data. MSC 416, CSGN/MME 418, SGSN 420, and S-GW 422 all interact with the UE 412 via the RAN 414. AS 410 may interact directly with GGSN/P-GW 424 over the Gi/Sgi interface 455B, which in turn interacts directly with SGSN 420 and/or S-GW 422 in order to send and receive data. UE 412 interacts via Um/Uu/LTE-Uu 440 with RAN 414, GGSN/P-GW 424 interacts via Gi/Sgi 455A with SCS 406, MTC-IWF 404 interacts via S6m 451 with HSS 434, and MSC 416 interacts with CSGN/MME 418 over SGs 446.

An A-SCEF-based Internet-Of-Things ("IOT") Communications System 400 may include: a SCEF 402, a MTC-IWF 404 complex 411, and a SCS 406, the functions of which collectively form the A-SCEF 460. In some embodiments, the (SCEF+MTC-IWF) complex 411 is implemented for non-IP data delivery ("NIDD") support and is referred to herein as a 3GPP SCEF Extension ("3GPP-SCEF-E"). In other embodiments, the SCEF 402, MTC-IWF 404 and MTC-AAA 408, collectively, comprise the 3GPP-SCEF-E 411, which can handle functionality with the T4 interface.

Figure 3:
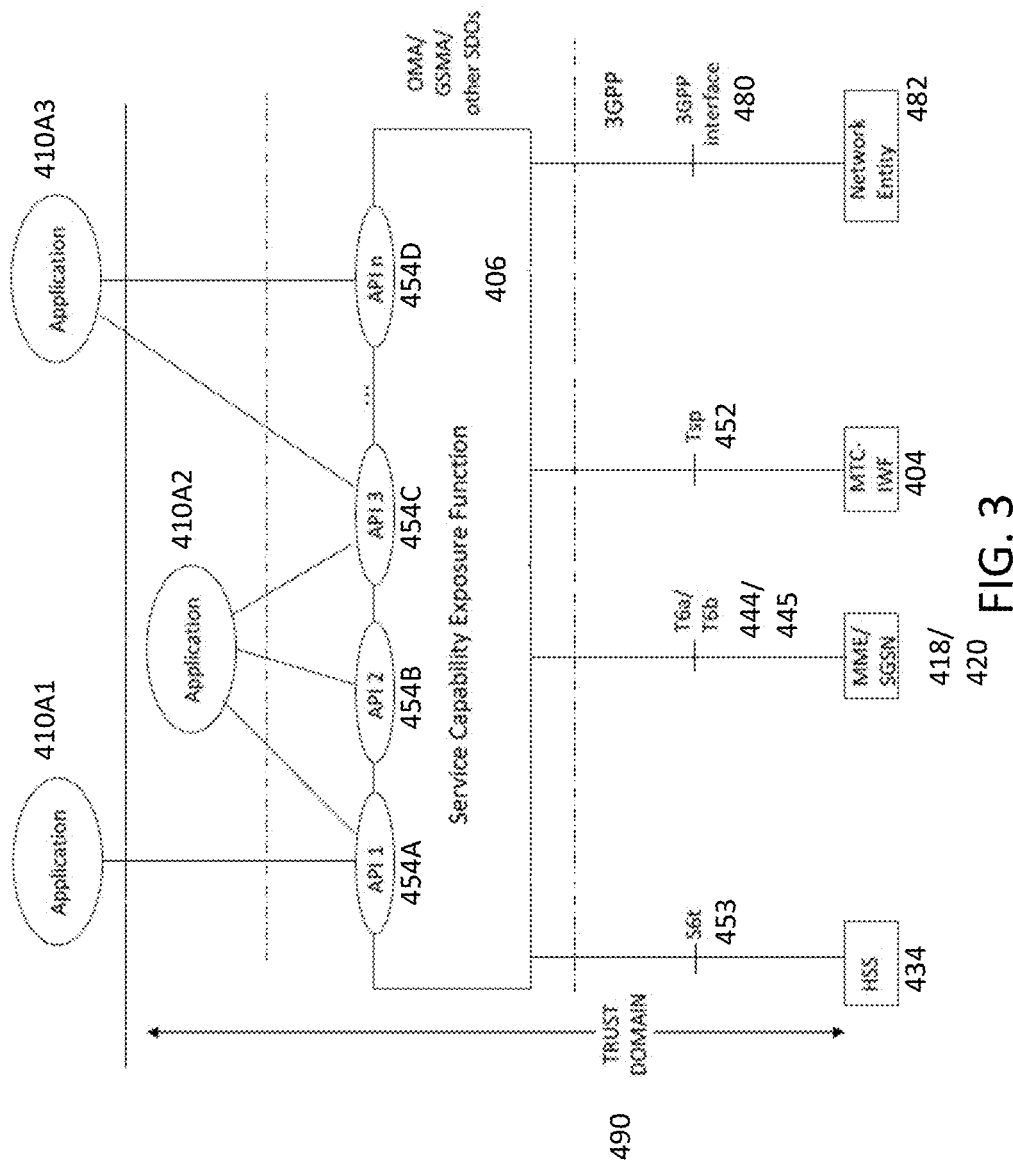
FIG. 3 is a block diagram of an SCEF implementation.

FIG. 3 is a block diagram of a Service Capability Exposure Function ("SCEF") from the 23.682 specification, using similar reference numerals for similar elements to those provided with reference to FIG. 2. As shown in FIG. 3, the Application 410A2, SCEF 406, HSS 434, MME/SGSN 418/420, MTC-IFW 404, and other unspecified network entities 482 may be in the trust domain 490, indicating traffic that can be trusted. Also as shown in FIG. 3, the interface between the HSS 434 and the SCEF 406 is S6t 453, the interface between the MME/SGSN 418 420 is T6a 444 or T6b 445, the interface between the MTC-IWF 404 is Tsp 452, and the interface between the network interface 482 and the SCEF 406 is a 3GPP interface 480. Communication from Application 410A1 can travel to the SCEF 406 via an API 454A, Communication from Application 410A2 can travel to the SCEF 406 via an API 454B, Communication from Application 410A3 can travel to the SCEF 406 via an API 454C, and Communication from Application 410A4 can travel to the SCEF 406 via an API 454D. Applications 410A1 and 410A3 may be outside of the trust domain 490. Additional gateways may be implemented for security purposes, such as for the Applications 410A1 and/or 410A3. It should be appreciated that while reference is made herein to the MME/SGSN 418/420, the MME/SGSN may be simply an MME 418, or an SGSN 420, a PGW, an SGW, or any similar network element performing at least some of the functions associated with the MME 418. Thus, as used herein, the MME 418 or the MME/SGSN 418/420 refers to any such element unless otherwise noted.

Exemplary South-Bound Communications

According to some embodiments, south-bound interfaces supported by the systems and methods described herein include but are not limited to: the T6a/T6ai south-bound interface to C-SGN (MME) (see, e.g., T6a interface 444 with C-SGN (MME) 418 of FIG. 2) and the S6t south-bound interface to the HSS (see, e.g., S6t interface 453 with home subscriber server ("HSS") 434 in FIG. 2). Over time, additional south-bound interfaces may be supported, such as, for example, the SGi interface to PGW.

Functionality of A-SCEF

Exemplary Deployment Model

In some implementations, the A-SCEF is a virtualized network function deployable in a number of different environments, such as but not limited to Network Functions Virtualization ("NFV") environments and/or as containers.

According to some embodiments, the A-SCEF architecture can be highly scalable and support both scale-in (scalability for adding to the network) and scale-out (scalability for removing from the network) functions for achieving near-linear incremental scale. In other words, the systems and methods disclosed herein are compatible with deployments that scale nearly linearly, and using the systems and methods described herein does not significantly hinder the scalability of a network.

According to some embodiments, the A-SCEF can support multiple deployment scenarios. As a baseline, a single instance of the A-SCEF can interface with one or more Application Servers on the north-bound side, and one or more C-SGNs on the south-bound side. According to some embodiments, multiple instances of the A-SCEF may be simultaneously deployed ("multi-tenancy") and, by doing so, provide options to achieve separate Service Level Agreements for each AS (or grouping of Application Servers). The multiple instances of A-SCEF can interface with common C-SGNs or dedicated C-SGNs.

Exemplary North-Bound Messaging API

The Open Mobile Alliance defines standardized APIs that can be used for different IoT communications. An exemplary list of standardized APIs defined by the Open Mobile Alliance (in conjunction with GSM OneAPI) can be found at the webpage http://www.openmobilealliance.org/wp/includes. One of these exemplary APIs includes the RESTful Network API for Messaging 1.0 is an example application for SCEF API support. The chosen API(s) is non-limiting, as the system and methods disclosed in the present disclosure are compatible with various APIs. According to some embodiments, a subset of these APIs enable an exemplary beneficial use case (API based non-IP delivery for NB-IoT devices)—for example, the APIs:

Allow the AS 410A/410B to send a message to a device

Allow the AS 410A/410B to check delivery status of the outgoing message to a device Allow the AS 410A/410B to check for incoming messages (polling mode)

Allow the AS 410A/410B to subscribe to notifications for inbound messages from devices Allow the AS 410A/410B to retrieve the inbound message (as well as delete it)

As used herein, the word "message" includes, but is not limited to SMS/MMS/VoiceMail, etc. These messages may be identified as be defined in the 3GPP standard. However, according to some embodiments, the equivalents of these types of messages in future generations, or any other similarly functioning message standards may be used with the systems and methods discussed in the present disclosure. The 3GPP has defined support for SMS in standards documents 23.040, "Digital Cellular Telecommunications System (Phase 2+) (GSM); Universal Mobile Telecommunications System (UMTS); Technical Realization of the Short Message Service (SMS)" and 23.204, "Universal Mobile Telecommunications System (UMTS) LTE; Support of Short Message Service (SMS) over generic 3GPP Internet Protocol (IP) access; Stage 2," the contents of which are herein incorporated by reference in their entireties. According to an exemplary embodiment, the A-SCEF treats the "message" as an opaque payload (e.g., the A-SCEF operates independently of the content of the payload) to be sent to the device of interest via the C-SGN (e.g., using Data-Over-NAS, or "DONAS"). It should be appreciated that more complex deployments may include an A-SCEF that considers the payload, and operates based on pre-defined rules to send particular SMS messages based on those pre-defined rules when instructed to by an AS. Most call models specified in the 3GPP standards for NB-IoT devices require delivery of about 200-byte messages. In some embodiments of the present disclosure, the message size is up to 512 bytes. However, the message size is non-limiting, and can be set to any desired byte limit.

Standard-Specified SMS Pathway

The typical protocol contemplated by the 23.682 standard requires SMS message delivery to an UE via a SMS-SC. Packets corresponding to the message to be sent through the SMS-SC can be transported via the Internet Protocol ("IP data"), which contains the data to be sent and the UE to which the data is to be sent. For example, with reference to FIG. 2, an AS 410A or an SCS 406 may be the source of the message data, and the source deposits the request to send the message via API 454 (e.g., via an HTTP(S) invocation.) By way of the API 454, the source identifies the UE 412 to which the data is to be sent, for example, by its International Mobile Subscriber Identity ("IMSI")/Mobile Station International Integrated Services Digital Network Number ("MSISDN") (or other equivalent ID) and the payload of the message. The message data is forwarded by the SCEF 411 to the SMS-SC 428 via the T4 interface 447. The SMS-SC 428 then determines how to reach the UE 412 and sends the payload data as an SMS message using the appropriate interface (e.g., SGd interface 442). Standards document 23.682 discloses the communication protocol channels by which SMS messages can traditionally travel.

Figure 4:
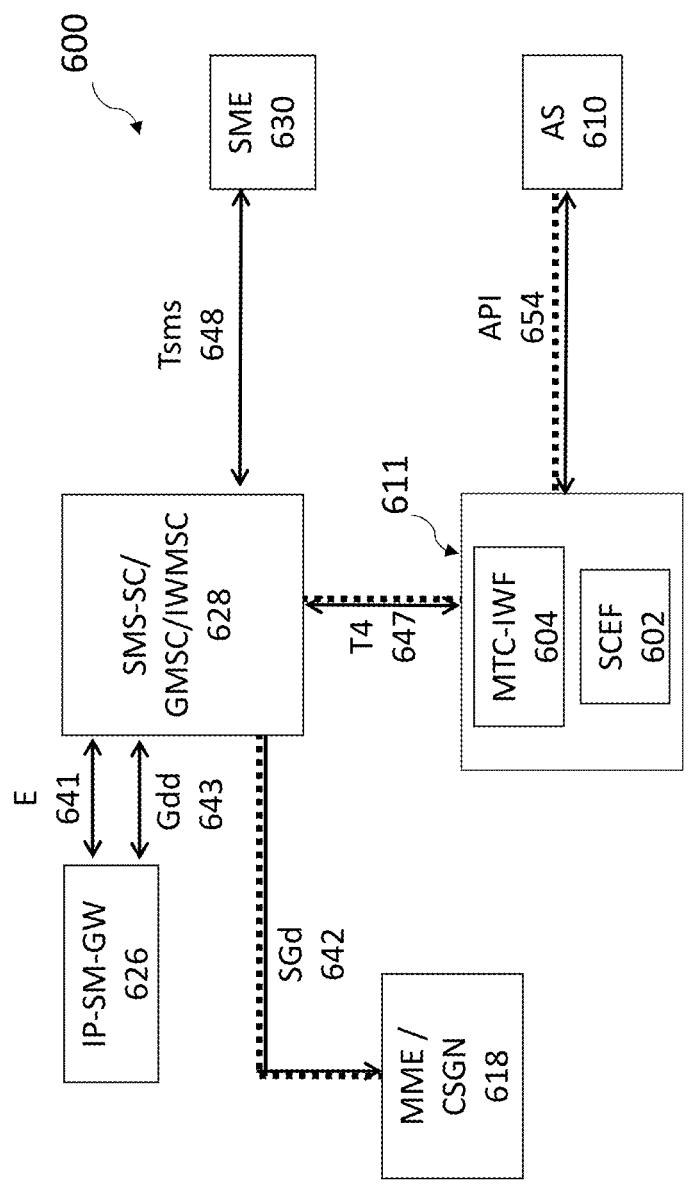
FIG. 4 is a simplified block diagram of communication between an Application Server and an MME/CSGN.

FIG. 4 shows the SCEF-based Internet-Of-Things ("IOT") Communications System pathway 600 for sending of data payloads via SMS messages, specified within standards document 23.682. Communication from AS 610 may travel to the SCEF complex 611 (including MTC-IWF 604 and SCEF 602) via an API 654. From the SCEF complex 611, south-bound data may travel via, for example, the T4 interface 647 to SMS-SC/GMSC/IWMSC 628. SMS-SC/GMSC/IWMSC 628 may support the Indirect and Hybrid models of Machine Type Communication, for example, as described in the 23.682 specification.

From the SMS-SC/GMSC/IWMSC 628, SMS messages may travel via the SGd interface 642, which is defined for the transmission of IP data within the 29.338 standards document. SGd interface 642 allows for the transmission of Mobile Originated ("MO") and Mobile Terminated ("MT") Forward Short Message Requests in the form of SMS packets. The SMS packets arrive at MME/CSGN 618 and may then be sent to the individual UE (shown as UE 412 in FIG. 2) for which the message was intended. SMS-SC/GMSC/IWMSC 628 also interacts with IP-SM-GW 626 via E/Gdd 641 643.

According to some embodiments, SMS messages also may originate from Short Messaging Entities ("SME") 630, which represent an entity outside the 3GPP network to communicate with UEs. Those SMS messages may be communicated via a Tsms interface 648 to SMS-SC 628 before following SGd interface 642 to MME/CSGN 618.

Standard-Specified Non-IP Data Delivery Pathway

Functions for Non-IP Data Delivery ("NIDD") may be used to handle mobile originated (MO) and mobile terminated (MT) communication between UEs and other entities (e.g., Application Servers), where the data used for the communication is considered unstructured (e.g., opaque) from the Evolved Packet System ("EPS") standpoint, sometimes referred to as non-IP data. Referring to FIG. 2, the 23.682 specification contemplates communication of NIDD from SCEF complex 411 to MME/CSGN 418 via, for example, a T6a interface 444. NIDD is not used to communicate data payloads via SMS messages between SCEF 411 and MME/CSGN 418 within the 23.682 specification because the packets required for SMS messages are not compatible to travel via the T6a interface 444 to the MME/CSGN 418 because the MME/CSGN 418 would not be able to identify a communication intended as an SMS. NIDD can refer to situations where a UE or AS embeds the data it wants to send in a transparent container without using an IP stack at all. According to the standards specification, the MME/CSGN 418 would have no way to distinguish an SMS message versus NIDD.

According to some embodiments, Application Servers may use an API to submit the NIDD request to an SCEF, where an SCEF may limit or aggregate requests to a particular UE. The SCEF may then forward that request, for example, via a T6a interface, to an MME/CSGN. The MME/CSGN can retain the NIDD request until a communication event between the UE and MME/CSGN for the NIDD request to successfully complete. The T6a interface maintains a longer life cycle to establish connection between the MME/CSGN and the AS. NIDD transmission along the T6a interface is used for communication between SCEF 402 and MME/CSGN 418 is discussed in the protocols laid out in standards document 23.682. The T6a interface commands are discussed in 3GPP standards document 29.128. The commands related to NIDD are also contained therein, providing for communication from MME/CSGN 418 and SCEF 402.

T6a interface is described in greater detail in the 23.682 standards document. In general, the T6a interface provides a conduit by which information can be shared between the nodes of the 3GPP architecture disclosed in standards document 23.682. Before a NIDD transfer via SCEF 402 can be performed, AS 410A/410B must register with SCEF 402, and assign itself as the AS for the particular UE via a specified API. Also, individual UE devices must register with MME/CSGN 418 before communicating indirectly with AS 410A/410B.

Efficient Networks via the A-SCEF

As networks grow, thereby increasing the number of UE nodes, increased costs follow for infrastructure and maintenance, driving the need for more efficient communication between nodes of the network. According to some embodiments, the present disclosure describes cost effective solutions that lower the number of network nodes between an UE and an AS and utilize communication channels to efficiently maximize communications between devices using the 3GPP architecture. Ever-increasing network size demands increased infrastructure and an implementation of SMS-capable networks would therefore require creation and maintenance of multiple SMS Service Centers ("SMS-SC") given the structure set forth in the 23.682 standards. Although the embodiments below are described using SMS, it should be appreciated that other types of messages fall within the scope of the systems and methods described below.

According to embodiments set forth herein, a set of node-connecting interfaces are defined within an A-SCEF that work together to provide substantial flexibility to the Service Provider in delivering SMS over the network directly from an A-SCEF to an MME/CSGN without use of SMS-SC gateways. Existing standard communication interfaces exist that provide communication between nodes of a 3GPP network. Embodiments of the invention enable a Service Provider to use these existing interfaces to eliminate unnecessary nodes while retaining the ability to communicate with NB-IoT devices. For example, in one implementation, the need for SMS-SC nodes is eliminated by using NIDD to transmit SMS messages via existing interfaces without the SMS-SC and translating that information at the respective nodes of the standard network structure. The disclosed embodiments may use the existing T6a and/or a SGd interfaces between an MME/CSGN and an A-SCEF to communicate SMS messages, however, other interfaces such as those developed in later generations are contemplated. The messages may be stored at the MME/CSGN between communication intervals between the MME/CSGN and UE when the data may then be delivered.

As discussed in more below, either the T6a or SGd protocols may be used. Implementation using the T6a interface is discussed with reference to FIGS. 5A-5B, while implementation using the SGd interface is discussed with reference to FIGS. 6A-6B. It should be appreciated that various deployments may support SGd or T6a, and selection between the two is not limiting.

According to some embodiments, using the SGd interface does not require modification of the MME, which may continue to assume it is receiving communications from existing network infrastructure. Since the MME already receives data intended for SMS delivery via the SGd interface, the MME may simply recognize that the message is received via an SGd interface and coordinate an SMS message to the UE without learning that the message was received without use of the SMS-SC. Accordingly, by configuring an A-SCEF to communicate with the MME via an SGd interface, messages may be sent to a UE via SMS without the SMS-SC and without having to reconfigure the MME.

According to an alternative embodiment, the T6a interface may be used. As discussed above, the A-SCEF may already be configured to communicate with the MME via the T6a interface for NIDD. According to an exemplary embodiment, SMS data may be communicated from the A-SCEF to the MME by using a new flag in a communications message indicating that the data payload is to be sent via SMS. The MME may be configured to recognize this flag, and to coordinate an SMS message to the UE. Accordingly, only a small modification is made, and no new communications interfaces are needed between the A-SCEF and the MME.

The T6a Protocol

Figure 5A:
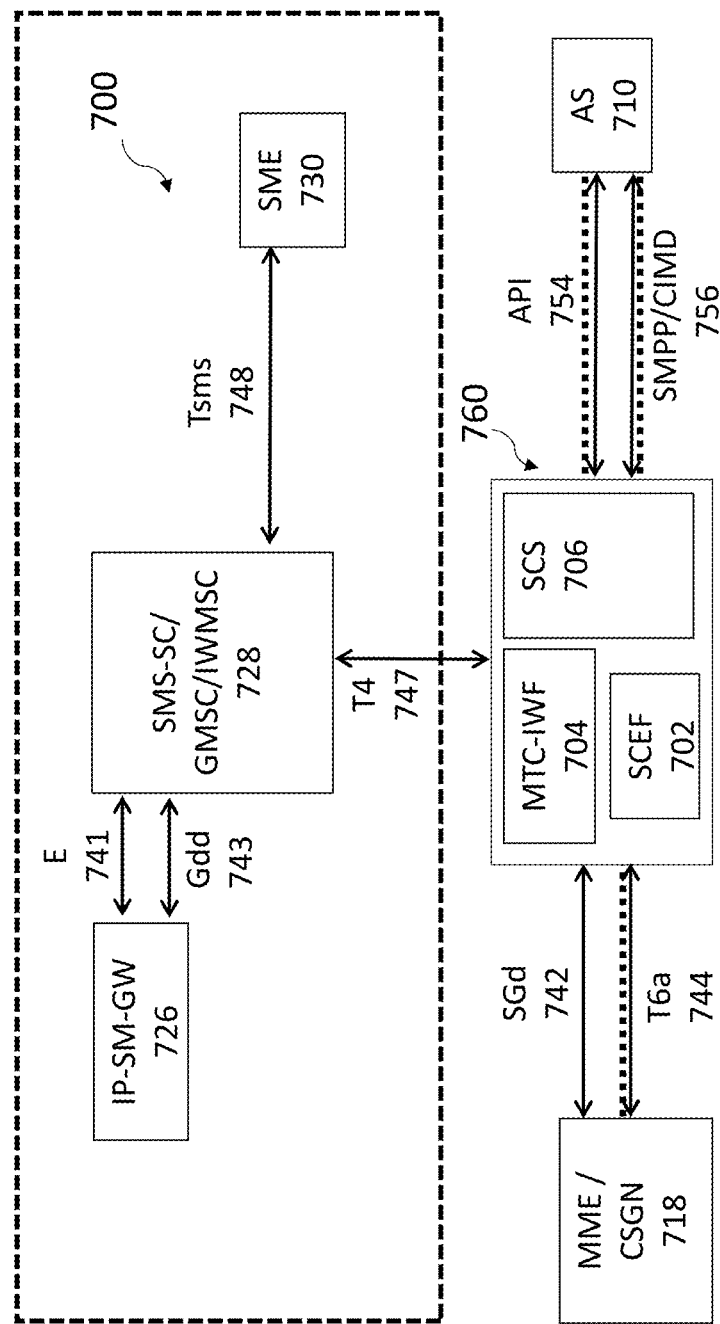
FIGS. 5A and 5B show a simplified block diagram and method of communication between an Application Server and an MME/CSGN via an SCEF, in accordance with some embodiments of the present disclosure.

FIG. 5A pictorially shows an embodiment of a 3GPP network service capability by which SMS messages may be sent via a T6a interface 744 directly between A-SCEF 760 and MME/CSGN 718, in accordance with some embodiments of the present disclosure. According to some embodiments, the A-SCEF 760 receives a data payload to be sent via an SMS message, for example, via an API interface 754 or a Short Message Peer to Peer/Computer Interface to Message Distribution protocols ("SMPP/CIMD") 756. Rather than passing the data payload/message to the SMS-SC 728, the A-SCEF 760 (which includes SCS 706, MTC-IWF, 704 and SCEF 702) is configured to pass the message to the MME/CSGN 718 via the T6a interface 744. A-SCEF 760 also interacts with MME/CSGN 718 via SGd 742. The MME/CSGN 718 has likewise been configured (e.g., to recognize a flag indicating the data is to be sent via SMS) to accept and identify such a data payload/message, over the T6a interface, as one to be sent via an SMS message to a UE. The MME/CSGN 718 may cache the SMS message for proper delivery to the UE when, e.g., the UE communicates with the MME/CSGN on a pre-determined schedule, described in more detail below.

In some embodiments, the AS 710 identifies the target UE that is to receive the SMS message by an "Device ID". For example, the UE could be a power meter that communicates with a power company's enterprise server (the AS), and the UE has an Device ID of "power_meter_4". The A-SCEF 760 may communicate with an HSS (not shown) to match the Device ID with an IMSI or another network-usable identifier. This network-usable identifier is associated (e.g., via query to an HHS and then inclusion in a same message or associated message) with the payload data that the A-SCEF 760 passes to the MME/CSGN 718 as non-IP data via the T6a interface 744.

As mentioned above, according to some embodiments, the A-SCEF 760 may be configured to send data and the MME/CSGN 718 may be configured to accept data via the T6a interface 744 that may then be communicated as an SMS message to the UE, for example, in the way shown in FIG. 2. Specifically, the T6a protocol is extended to include an indication (e.g., via an added information element recognizable by the MME/CSGN 718) that a data payload for an SMS message is included in data traffic passing via the modified T6a protocol. The A-SCEF 760 may then set the indication (e.g., populates the field or sets the flag) when such a message is being passed to the MME/CSGN 718. The MME/CSGN 718 may then read the indication and delivers the SMS message to the UE over the Non-Access Stratum ("NAS") via an eNodeB. Sending the SMS message between A-SCEF 760 and MME/CSGN 718 via the T6a interface 744 and then on to the UE in accordance with NIDD techniques provides for a relatively lower-energy and longer lasting connection than a connection that relies upon an IP connection.

Figure 5B:
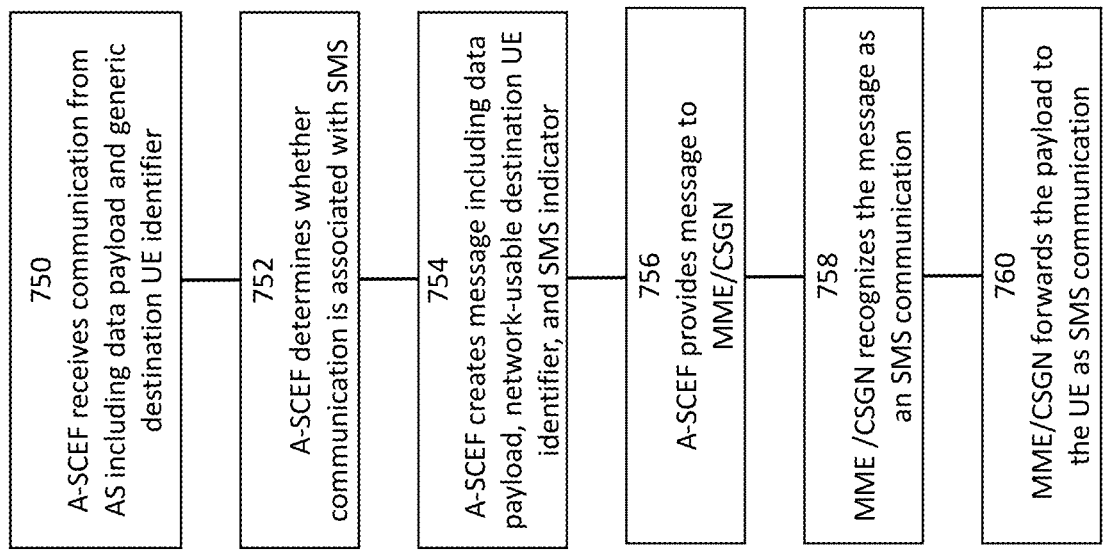

FIG. 5B shows a method of sending an SMS by bypassing an SMS-SC and using a T6a interface, according to some embodiments of the present disclosure. At step 750, the A-SCEF receives a communication from AS including a data payload and a generic destination UE identifier. At step 752, the A-SCEF may determine whether the communication is associated with an SMS communication. This may be based on information provided to the A-SCEF from the AS, or may be based on known or requested information about the UE associated with the generic destination UE identifier. At step 754 the A-SCEF may create a message including the data payload, a network-usable destination UE identifier, and an SMS indicator. This may be based on the determination that the at least one communication is associated with an SMS communication. Next, at step 756, the A-SCEF may provide the message to MME/CSGN, for example, over a T6a interface. At step 758, the MME/CSGN recognizes the message as an SMS communication, for example, based on the SMS indicator. At step 760 the MME/CSGN forwards the payload to the UE as an SMS communication.

The SGd Protocol

Figure 6A:
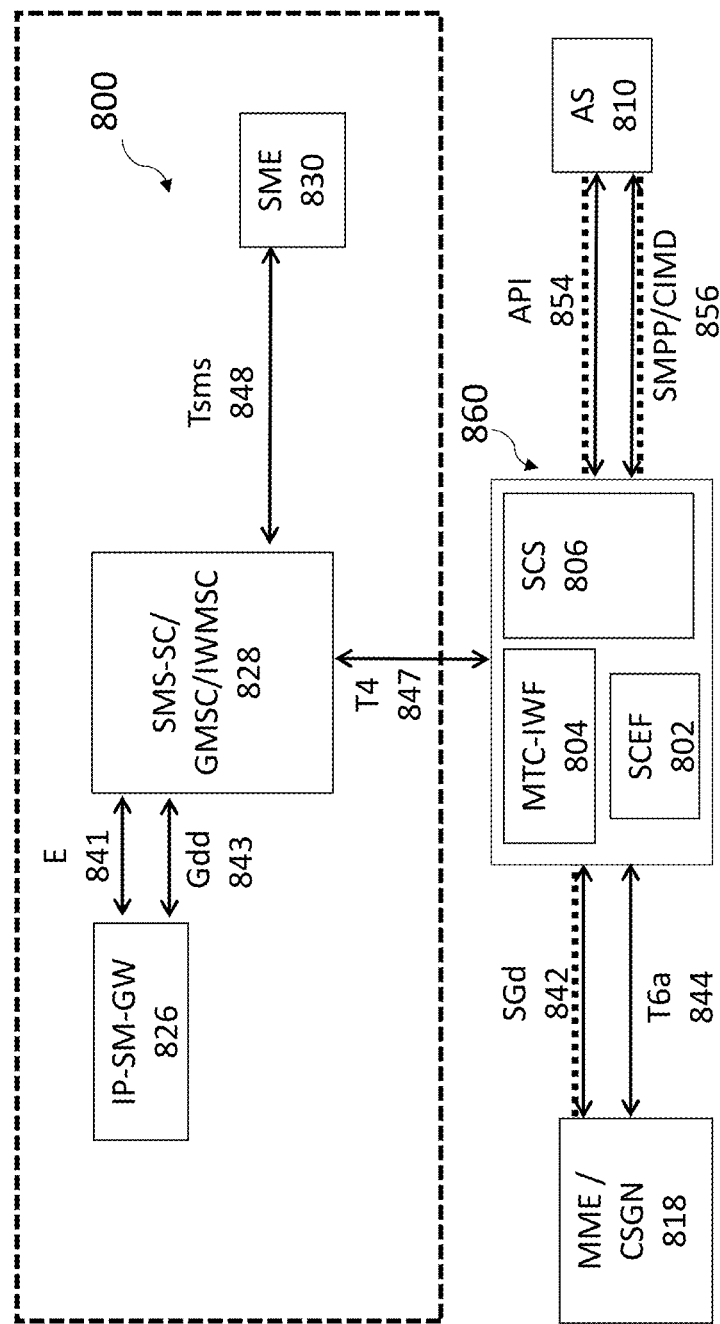
FIGS. 6A and 6B show a simplified block diagram and method of communication between an Application Server and an MME/CSGN via an SCEF, in accordance with some embodiments of the present disclosure.

FIG. 6A pictorially shows an embodiment of a 3GPP network service capability by which SMS messages may be sent via an SGd interface 842 directly between A-SCEF 860 and MME/CSGN 818, according to some embodiments of the present disclosure. According to some embodiments, the A-SCEF 860 (which includes an SCS 806, MTC-IWF 804, and SCEF 802) may receive a data payload to be sent via SMS message via an API interface 854 or an SMPP/CIMD 856. Rather than passing the data payload/message to the SMS-SC 828, the A-SCEF 860 may be configured to pass the message to the MME/CSGN 818 via the SGd interface 842. The MME/CSGN 818 has likewise been configured (either based on previous deployments or to implement the system and methods described herein) to accept and identify such a data payload/messages, over the SGd interface, as one to be sent via an SMS message to the UE. The MME/CSGN 818 may cache the SMS message for proper delivery to the UE when, e.g., the UE communicates with the MME/CSGN on a pre-determined schedule, described in more detail below. A-SCEF 806 can also interact with MME/CSGN 818 via T6a 844.

In some usage scenarios, the AS 810 identifies the target UE that is to receive the SMS message by a Device ID, as set forth above. As discussed above with reference to the T6a interface, the A-SCEF 860 may communicate with an HSS to match the Device ID with an IMSI or another network-usable identifier. This network-usable identifier is associated (e.g., in the same or an associated message after querying, e.g., the HSS) with the payload data that the A-SCEF 860 passes to the MME/CSGN 818 via the SGd interface 842.

The A-SCEF 860 may be configured to send data and the MME/CSGN 818 may be configured to accept data via the SGd interface 842 that may then be communicated as an SMS message to the UE, for example, in the way shown in FIG. 2. The typical SGd protocol is able to carry such a data payload without the need for extension (e.g., without needing to add to the protocol to identify messages intended to be sent via SMS) because the MME/CSGN 818 already expects SMS over the SGd interface. The MME/CSGN 818 may then deliver the SMS message to the UE, e.g., via IP. Accordingly, the elements in the dashed box need not be included in the network. However, according to some embodiments, these network elements are kept to handle legacy traffic, such as that from the IP-SM-GW 826 and/or the SME 830. It should be appreciated, however, that these interfaces may also be moved to the A-SCEF such that most or all SMS requests are routed through the A-SCEF.

The use of the standard SGd interface 842 and/or the extended T6a interface 744 are not exclusive. In other words, implementations of the invention include having both options available in a given configuration such that an A-SCEF can use either interfaces/protocols to communicate the SMS message to a given MME/CSGN. Choosing one interface over the other (or both the T6a and SGd) will be based on implementation/operator specific factors such as the costs associated with operating T6a vs. SGd interfaces and/or the speeds thereof. Individuals or groups of subscribers may have different access to each of these interfaces.

Figure 6B:
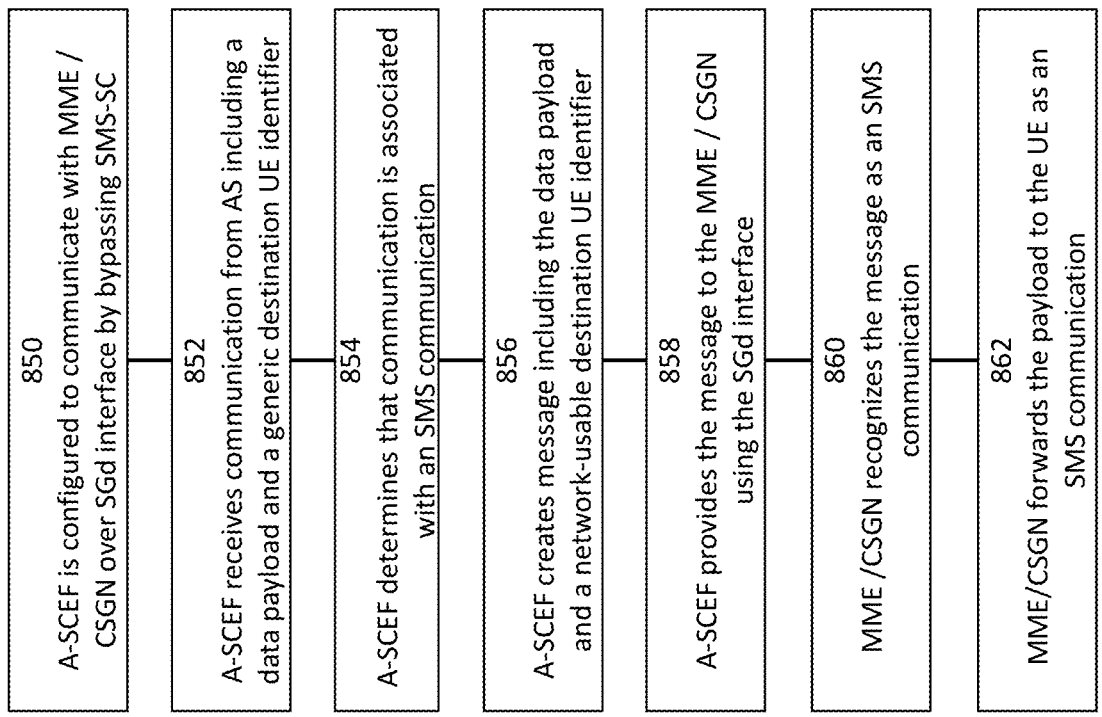

FIG. 6B shows a method of sending an SMS by bypassing an SMS-SC and using a SGd interface, according to some embodiments. At step 850, the A-SCEF is configured to communicate with a MME/CSGN over an SGd interface by bypassing an SMS-SC. At step 852, the A-SCEF receives a communication from an AS including a data payload and a generic destination UE identifier. At step 854, the A-SCEF determines that the communication is associated with an SMS communication. This may be based on information provided to the A-SCEF from the AS or may be based on known or requested information about the UE associated with the generic destination UE identifier. At step 856, the A-SCEF creates a message including the data payload and a network-usable destination UE identifier. At step 858, the A-SCEF provides the message to the MME/CSGN using the SGd interface. At step 860, the MME/CSGN recognizes the message as an SMS communication. At step 862, the MME/CSGN forwards the payload to the UE as an SMS communication.

North-Bound API & SMPP/CIMD

As shown in FIGS. 5 and 6, in boxes 700 and 800, respectively, the embodiments can, optionally, continue to provide communications between an SME 730/830 and an SMS-SC 728/828 via a Tsms interface 747/847. Likewise, the embodiments can, optionally, continue to provide communications between an SMS-SC 728/828 and an IP Short Message Gateway ("IP-SM-GW") 726/826 via an E interface 741/841 and/or Gdd interface 743/843. In such an embodiment, the number of SMS-SC nodes needed may be decoupled from the number of UEs to be served. Rather, the number of SMS-SC nodes may be scalable in proportion to the number of SMEs 730/830 seeking access to the core network. According to some embodiments, the A-SCEF may take over these functions as described above.

According to some embodiments, the implementations shown in FIGS. 5 and 6 may optionally have an SMPP/CIMD interface 756/856. This interface will be explained with reference to FIGS. 5A-5B and interface 756; it being understood that the explanation applies equally to the implementations shown in FIGS. 6A and 6B. SMPP/CIMD interface 756 enables an SME and/or other entities that support the interface/protocol to exchange data with A-SCEF 760. By including the SMPP/CIMD interface/protocol, A-SCEF 760 can continue to support relatively older legacy applications without requiring the legacy applications to be adapted to API 754.

Illustrative Call Flows

Illustrative examples of high-level call flows for some actions of the disclosed embodiments follow.

Once an operator signs up an Enterprise as a customer, the operator can provision the A-SCEF via the Management Portal with the appropriate certificate, security keys, and profiles for network use. At any point in time after that, the AS can use the north-bound-facing APIs or other interfaces to register UE IoT devices.

Device Registration by AS

Figure 7:
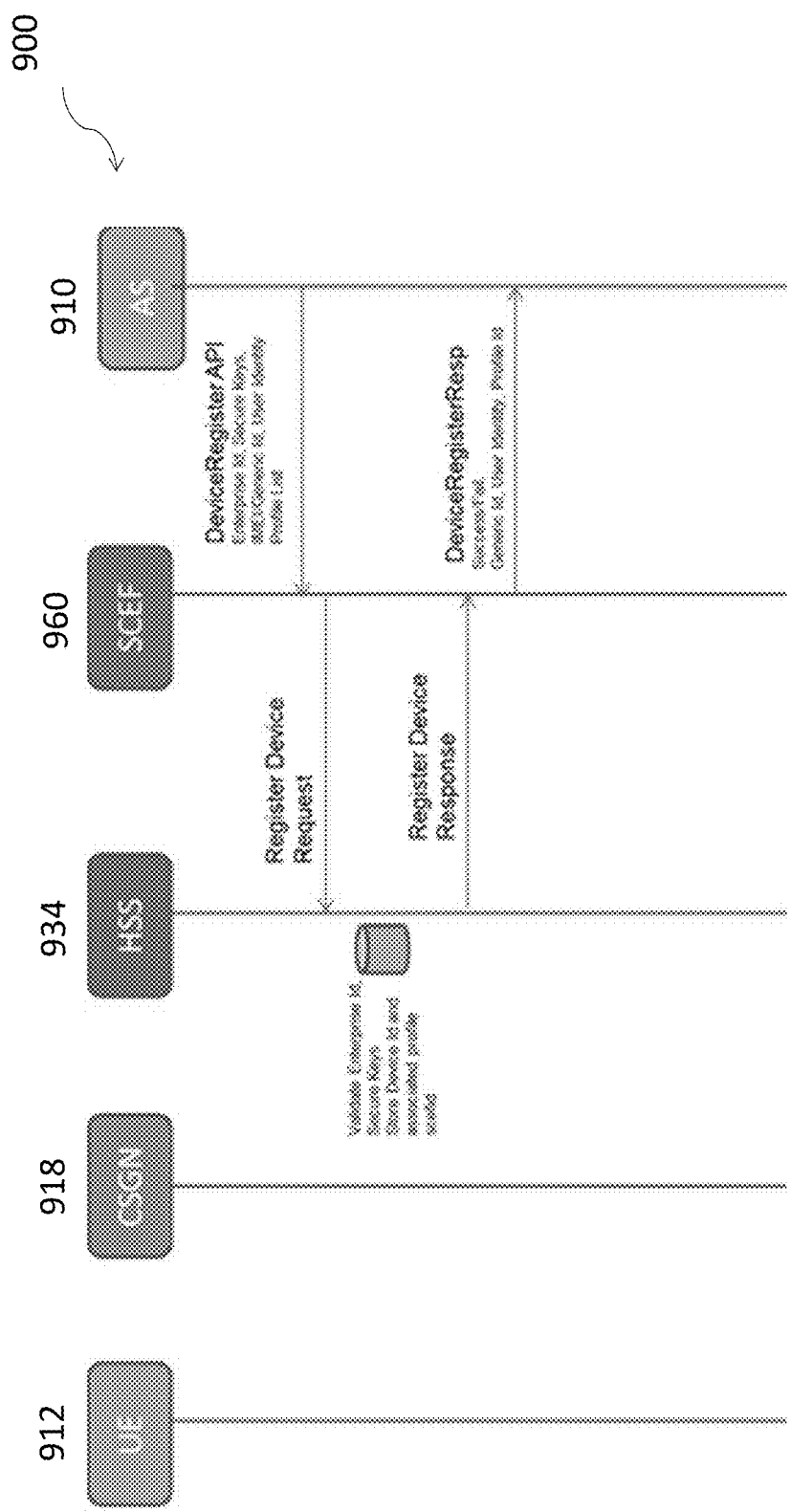
FIG. 7 is a simplified call flow diagram of communication between an Application Server and an SCEF, in accordance with embodiments of the present disclosure.

FIG. 7 shows an illustrative call flow 900 between an AS 910 and an HSS 934, in accordance with some embodiments of the disclosed subject matter. The call flow 900 shows that the AS 910 calls a Device Register API and provides, e.g., Enterprise ID, Secure Keys, Generic ID, Device ID, User Identity Profile List, International Mobile Station Equipment Identities ("IMEI"), IMSI, MSISDN, and/or other identifying information along with the desired traffic management profile. After authentication, the A-SCEF 960 sends a Register Device Request to HSS 934, and the mapping of the Generic ID (e.g., Enterprise ID and Device ID) to the appropriate IMEI/IMSI is maintained at the HSS 934. The HSS 934 validates the Enterprise ID and/or Secure Keys and stores the Device ID and/or the associated profile SCEFID, which identifies the particular A-SCEF at which the device has been registered. The HSS sends a Register Device Response back to the A-SCEF 960. In turn, the A-SCEF 960 sends a Device Register Response back to the AS 910 indicating a successful or unsuccessful registration. The HSS 934 may also pass the Generic ID, User Identity, and/or Profile ID back to the AS 910. If the registration was successful, all future traffic sent by the AS 910 to the registered NB-IoT device (UE 912) can, in turn, use the Generic ID to correctly identify the device. In FIG. 7, the SCEFID is assumed to be stored in the user profile on the HSS 934.

Mobile Terminated Data (AS to Device)

Figure 8:
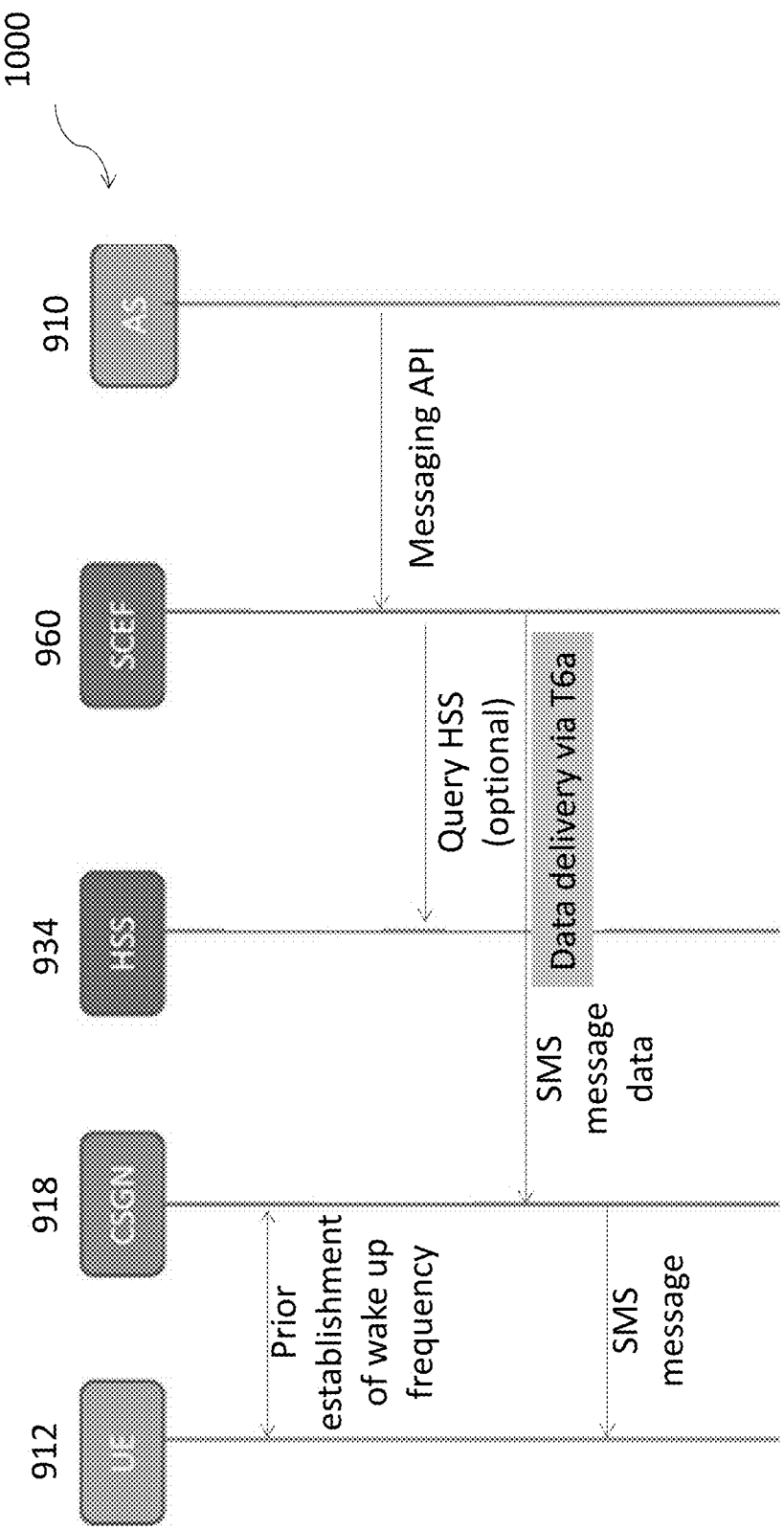
FIG. 8 is a simplified call flow diagram of communication between an Application Server and an MME/CSGN via an SCEF, in accordance with embodiments of the present disclosure.

FIG. 8 is a simplified call flow diagram 1000 of communication between the AS 910 and the MME/CSGN 918 via the A-SCEF 960, in accordance with embodiments of the invention. In FIG. 8, successful registration of the AS 910 with the HSS 934 is assumed, and the NB-IOT device (UE) 912 is assumed to have been successfully configured at the HSS 934 and attached to A-SCEF 960. At some earlier time, UE 912 may alert MME/CSGN 918 to its presence within the network. The entities may establish a predetermined frequency of wake-up intervals, varying depending upon, e.g., equipment configuration. The term "wake-up" as used herein identifies the time during which the UE 912 communicates with the core network. It should be appreciated that other scheduling techniques are contemplated.

As shown in FIG. 8, delivery of a data payload/message to the UE 912 is achieved by invoking one of the Messaging APIs and/or other interfaces on the north-bound-facing side of A-SCEF 960, and by including the message in the payload. Delivery can optionally be acknowledged via the notification API. AS 910 sends data to be communicated to the UE 912 via the API to A-SCEF 960, which can optionally query HSS 934 to obtain the IMSI or other network-usable identifier based on a Device ID supplied by the AS 910. A-SCEF 960 then sends the message data to MME/CSGN 918 (via, e.g., the T6a interface or SGd interface, as described above). The MME/CSGN 918 when delivers the data to UE 912 as an SMS message based on the predetermined wakeup schedule previously configured between UE 912 and MME/CSGN 918. In some implementations, UE 912 acknowledges the message via a mobile originated data response to MME/CSGN 918 (not shown). In such a case, the MME/CSGN 918 can then send a response to A-SCEF 960, which can optionally, send an Acknowledgment message to AS 910 (not shown). While FIG. 8 shows an illustrative call flow for delivery of message data via the T6a interface protocol described above, the same call flow structure would result from implementation of the SGd interface protocol, as described above.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and call flows described in this specification, including the method steps of the subject matter described herein, can be performed by one or more programmable processors executing one or more computer programs to perform functions of the subject matter described herein by operating on input data and generating output. The processes and call flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for optimizing Short Message Service (SMS) communications such that an SMS Service Center (SMS-SC) is bypassed in the communications, the method comprising:
   receiving, by an augmented Service Capability Exposure Function ("A-SCEF"), at least one communication from an Application Server ("AS"), the at least one communication including a data payload and a generic destination user equipment (UE) identifier;
   determining, by the A-SCEF, the at least one communication is associated with an SMS communication;
   creating, by the A-SCEF, a message including the data payload, a network-usable destination UE identifier, and an SMS indicator based on the determination that the at least one communication is associated with an SMS communication; and
   providing, by the A-SCEF, the message to a Mobility Management Entity ("MME") such that the MME recognizes the message as an SMS communication and forwards the data payload to the UE as an SMS communication.

2. The method of claim 1, wherein the receiving, by the A-SCEF, the at least one communication from the AS comprises receiving via an Application Programming Interface ("APP").

3. The method of claim 1, wherein the receiving, by the A-SCEF, the at least one communication from the AS comprises receiving the at least one communication via a Short Message Peer to Peer/Computer Interface to Message Distribution protocol ("SMPP/CIMD").

4. The method of claim 1, wherein the providing, by the A-SCEF, the message to the MME comprises providing the data payload over a T6a interface from the A-SCEF to the MME.

5. The method of claim 4, further comprising:
   receiving, by the MME, the message from the A-SCEF;
   determining, by the MME, the data payload is associated with an SMS communication based on the SMS indicator; and
   transmitting, by the MME, the data payload as an SMS communication to the UE.

6. The method of claim 5, wherein the transmitting by the MME further comprises transmitting, via the MME, the data payload to the UE at a predetermined wakeup time of the UE.

7. The method of claim 1, further comprising querying, by the A-SCEF, a home subscriber server ("HSS") to obtain the network-usable destination UE identifier.

8. The method of claim 1, wherein the UE is an Internet of Things ("IoT") device and the MME includes a Cellular Internet of Things (CIoT) Serving Gateway Node (CSGN).

9. A method for optimizing Short Message Service (SMS) communications such that an SMS Service Center (SMS-SC) is bypassed in the communications, the method comprising:
   receiving, by an augmented Service Capability Exposure Function ("A-SCEF"), at least one communication from an Application Server ("AS"), the at least one communication including a data payload and a generic destination user equipment (UE) identifier;
   determining, by the A-SCEF, the at least one communication is associated with an SMS communication;
   creating, by the A-SCEF, a message including the data payload and a network-usable destination UE identifier; and
   providing, by the A-SCEF, the message to the MME using an SGd interface between the A-SCEF and the MME such that the MME recognizes the message as an SMS communication and forwards the data payload to the UE as an SMS communication.

10. The method of claim 9, wherein the receiving, by the A-SCEF, at least one communication from the AS comprises receiving the at least one communication via an Application Programming Interface ("API").

11. The method of claim 9, wherein the receiving, by the A-SCEF, the at least one communication from the AS comprises receiving via a Short Message Peer to Peer/Computer Interface to Message Distribution protocol ("SMPP/CIMD").

12. The method of claim 9, further comprising:
   receiving, by the MME, the message from the A-SCEF;
   determining, by the MME, the data payload is associated with an SMS communication based on a communication interface with the A-SCEF; and
   transmitting, by the MME, the data payload as an SMS communication to the UE.

13. The method of claim 12, wherein the determining by the MME that the payload is associated with an SMS communication comprises recognizing that the message was received using an SGd interface.

14. The method of claim 12, wherein the transmitting by the MME further comprises transmitting, via the MME, the data payload to the UE at a predetermined wakeup time of the UE.

15. The method of claim 9, further comprising querying, by the A-SCEF, a home subscriber server ("HSS") to obtain the network-usable destination UE identifier.

16. The method of claim 9, wherein the UE is an Internet of Things ("IoT") device and the MME includes Cellular Internet of Things (CIoT) Serving Gateway Node (CSGN).

17. A system for optimizing Short Message Service (SMS) communications such that an SMS Service Center (SMS-SC) is bypassed in the communications, the system comprising:
an augmented Service Capability Exposure Function ("A-SCEF"), the A-SCEF including a processor and a non-transitory computer-readable storage medium having instructions stored therein that, when executed, cause the processor to:
receive at least one communication from an Application Server ("AS"), the at least one communication including a data payload and a generic destination user equipment (UE) identifier;
determine the at least one communication is associated with an SMS communication;
create a message including the data payload, a network-usable destination UE identifier, and an SMS indicator based on the determination that the at least one communication is associated with an SMS communication; and
provide the message to a Mobility Management Entity ("MME") such that the MME recognizes the message as an SMS communication and forwards the data payload to the UE as an SMS communication.

18. The system of claim 17, wherein the receiving the at least one communication from the AS comprises receiving the at least one communication via an Application Programming Interface ("APP").

19. The system of claim 17, wherein the receiving the at least one communication from the AS comprises receiving via a Short Message Peer to Peer/Computer Interface to Message Distribution protocol ("SMPP/CIMD").

20. The system of claim 17, wherein the providing message to the MME comprises providing the data payload over a T6a interface from the A-SCEF to the MME.

21. The system of claim 20, further comprising at least one MME configured to:
receive the message from the A-SCEF;
determine that the data payload is associated with an SMS communication based on the SMS indicator; and
transmit the data payload as an SMS communication to the UE.

22. The system of claim 21, wherein the transmitting by the MME further comprises transmitting, via the MME, the data payload to the UE at a predetermined wakeup time of the UE.

23. The system of claim 17, wherein the processor is further caused to query a home subscriber server ("HSS") to obtain the network-usable destination UE identifier.

24. The system of claim 17, wherein the UE is an Internet of Things ("IoT") device and the MME includes Cellular Internet of Things (CIoT) Serving Gateway Node (CSGN).

25. A system for optimizing Short Message Service (SMS) communications such that an SMS Service Center (SMS-SC) is bypassed in the communications, the system comprising:
an augmented Service Capability Exposure Function ("A-SCEF"), the A-SCEF including a processor and a non-transitory computer-readable storage medium having instructions stored therein that, when executed, cause the processor to:
receive at least one communication from an Application Server ("AS"), the at least one communication including a data payload and a generic destination user equipment (UE) identifier;
determine the at least one communication is associated with an SMS communication;
create a message including the data payload and a network-usable destination UE identifier; and
provide the message to the MME using an SGd interface between the A-SCEF and the MME such that the MME recognizes the message as an SMS communication and forwards the data payload to the UE as an SMS communication.

26. The system of claim 25, wherein the receiving at least one communication from the AS comprises receiving via an Application Programming Interface ("API").

27. The system of claim 25, wherein the receiving the at least one communication from the AS comprises receiving the at least one communication via a Short Message Peer to Peer/Computer Interface to Message Distribution protocol ("SMPP/CIMD").

28. The system of claim 25, further comprising at least one MME configured to:
receive the message from the A-SCEF;
determine the data payload is associated with an SMS communication based on the communication interface with the A-SCEF; and
transmit the SMS communication to the UE.

29. The system of claim 28, wherein the determining by the MME that the payload is associated with an SMS communication comprises recognizing that the message was received using an SGd interface.

30. The system of claim 28, wherein the transmitting by the MME further comprises transmitting, via the MME, the SMS communication to the UE at a predetermined wakeup time of the UE.

31. The system of claim 25, wherein the processor is further caused to query a home subscriber server ("HSS") to obtain the network-usable destination UE identifier.

32. The system of claim 25, wherein the UE is an Internet of Things ("IoT") device and the MME includes Cellular Internet of Things (CIoT) Serving Gateway Node (CSGN).

* * * * *